March 24, 1931. F. B. SCHUYLER Re. 18,010

DRIVING MECHANISM FOR WASHING MACHINES

Original Filed Nov. 1, 1926 2 Sheets-Sheet 1

THE JOHNSON WASHER COMPANY
Assignee of
FRANK B. SCHUYLER
Inventor
by Smith and Freeman
Attorneys March 24, 1931. F. B. SCHUYLER Re. 18,010

DRIVING MECHANISM FOR WASHING MACHINES

Original Filed Nov. 1, 1926 2 Sheets-Sheet 2

THE JOHNSON WASHER COMPANY
Assignee of
FRANK B. SCHUYLER
Inventor
by Smith and Freeman
Attorneys Reissued Mar. 24, 1931 Re. 18,010

UNITED STATES PATENT OFFICE

FRANK B. SCHUYLER, DECEASED, LATE OF BERKELEY, CALIFORNIA, BY THE JOHNSON WASHER COMPANY, ASSIGNEE, OF OAKLAND, CALIFORNIA, AND CLEVELAND, OHIO, ASSIGNOR, BY MESNE ASSIGNMENTS, TO THE JOHNSON WASHER COMPANY, A CORPORATION OF CALIFORNIA

DRIVING MECHANISM FOR WASHING MACHINES

Original No. 1,742,616, dated January 7, 1930, Serial No. 145,535, filed November 1, 1926. Renewed June 20, 1928. Application for reissue filed May 17, 1930. Serial No. 453,427.

This invention relates to clothes washing machines of the impeller type and especially to a driving mechanism whereby an oscillating movement is transmitted to the impeller.

The object of the present invention is to generally improve and simplify the construction and operation of washing machines of the impeller type and to provide an impeller type of washer which will permit proper and efficient handling of all fabrics or clothes from the coarsest to the most delicate by providing means whereby the velocity of the water and movement of the clothes may be regulated so that injury or excess wear on the fabric is prevented.

The invention more specifically stated, embodies in combination with an impeller and its driving shaft, gearing connections of simple nature whereby the amplitude of oscillation of the impeller may be varied while maintaining its frequency substantially constant; the result being that the peripheral velocity of the impeller may be increased or decreased substantially without change in its speed as indicated by the number of strokes per minute.

One form which the invention may assume is shown by way of illustration in the accompanying drawings, in which.

Figure 1:
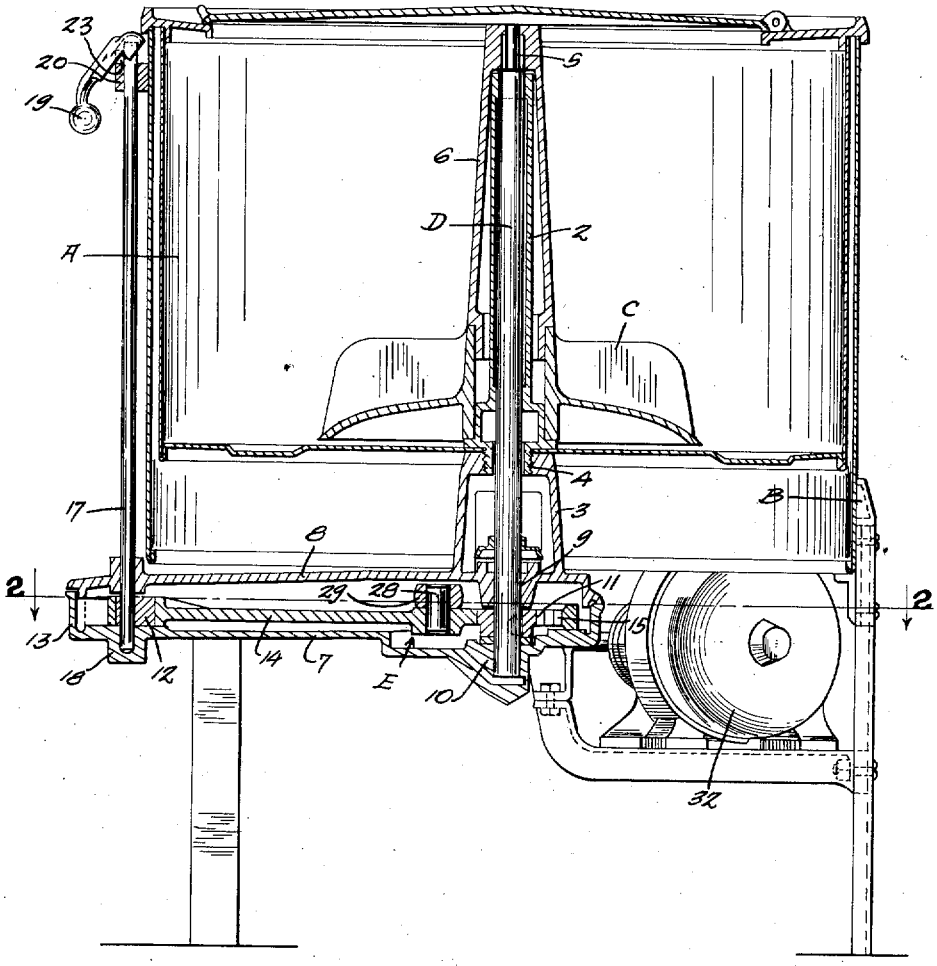
Figure 1 is a central vertical section of the washing machine.
Figure 2:
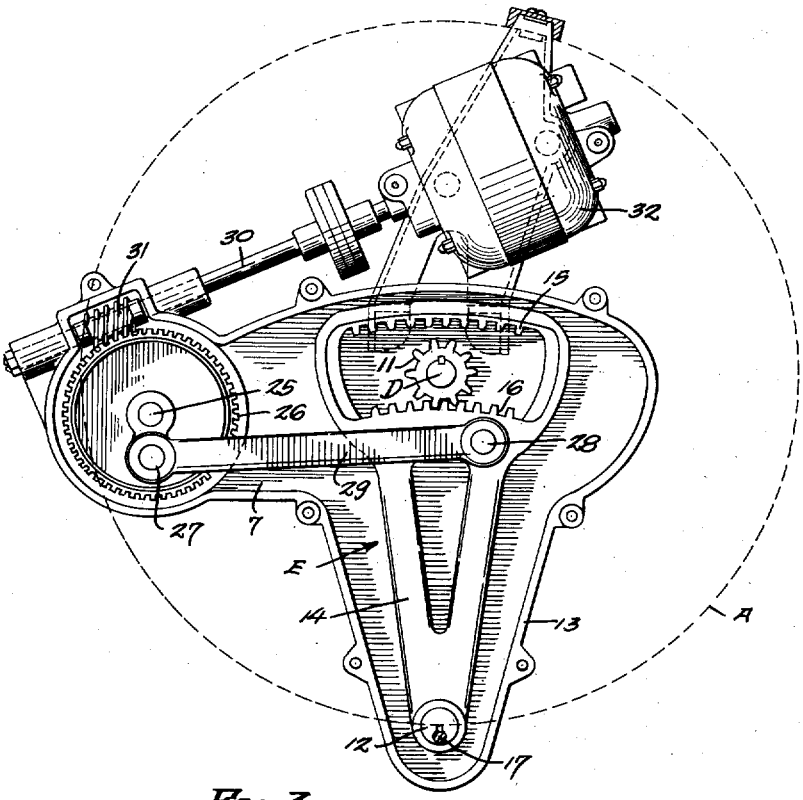
Figure 2 is a horizontal section taken on the line II—II of Figure 1.
Figure 3:
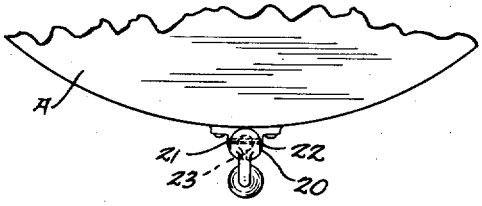
Figure 3 is a plan view of the notched segment 20 and the operating lever 19.

Referring to the drawings, in detail and particularly to Figures 1 and 2, A indicates a tub of suitable construction, B a frame supporting the same, C an impeller, D the driving shaft whereby an oscillating movement is transmitted to the impeller and E indicates, in general, a driving mechanism whereby the driving shaft and the impeller are actuated. The tub is, in this instance, centrally perforated to receive a bearing tube 2 and a bearing bracket 3, the tube and the bracket being connected by a threaded connection, as indicated at 4. This connection secures the members with relation to each other and also forms a water-tight connection, which prevents leakage from the tub.

The driving shaft extends through the upper end of the tube and is provided with a flattened or polygonal extension 5 whereby a driving connection is formed between the shaft and the impeller, that is, the impeller is provided with an upwardly extending tubular extension 6 and the extreme upper end thereof is provided with a socket for the reception of the driving extension 5. This type of connection is of further importance as it permits endwise movement of the impeller when drying out the tub, cleaning the same or otherwise.

The driving mechanism generally indicated at E is enclosed in a housing consisting of a base section 7 and a cover section 8, the cover section being, in this instance, a part of the bearing bracket 3, as it is formed integral therewith. The driving shaft extends through the housing section 8 and it is journaled therein, as at 9. It also extends downwardly into the housing section 7 and the lower end is journaled in a bearing member 10.

Keyed or otherwise secured on the driving shaft intermediate the bearing members 9 and 10 is a gear pinion 11 and pivotally mounted as at 12 in a lateral extension of the housing indicated at 13, is a rocker arm 14 and formed on the swinging end of the rocker arm are a pair of reciprocable driving gears or segmental racks 15 and 16 of unequal radius and hence of different linear speed and mechanical advantage. These racks are disposed on opposite sides of the gear pinion 11 and in the same plane and means are provided whereby either rack may be moved into mesh with the pinion. This is accomplished, as follows:—

Extending down one side of the tub is a shaft 17. The lower end of this shaft extends through the housing sections 7 and 8 and is journaled therein, as indicated at 18. Secured on the shaft intermediate the bearing members is an excentric 12. This excentric forms a pivotal support for the rocker arm 14, previously referred to. The upper end of the shaft is provided with an operating lever 19 which is adapted to be swung over a notched segment 20. The lever serves the function of rotating the shaft 17 and the excentric 12 secured on the lower end thereof and it may be rotated through an arc of 180°. The segment in the upper end of this shaft is provided with three notches. The operating lever engages the notch 21 when the excentric assumes the position shown in Figure 2. It engages the opposite notch 22 when the excentric is rotated 180° and it engages the intermediate notch 23 when a neutral position is to be assumed, as will hereinafter be described.

Endwise movement is imparted to the rocker arm 14 and the gear racks 15 and 16 carried thereby during rotary movement of the excentric. When the excentric assumes the position shown in Figure 2, the gear rack 16 will intermesh with the pinion 11. When the excentric is turned 180°, endwise movement is imparted to the rocker arm causing the gear segment 15 to move into engagement with the pinion and when the excentric assumes an intermediate position, neither rack will engage the pinion and the neutral position referred to is, accordingly, resumed.

An oscillating movement is imparted to the rocker arm and the gear racks carried thereby, when the washing machine is in operation and this movement is transmitted as follows:—

Journaled in one end of the housing members 7 and 8 is a shaft 25. Secured on the shaft is a worm gear 26 and carried by the worm gear is a crank pin 27. Similarly mounted on the rocker arm 14 is a crank pin 28 and connecting the pins 27 and 28 is a connecting rod 29. Journaled in one side of the housing is a primary driving shaft 30. Secured thereon and meshing with the worm gear 26 is a worm pinion 31. The primary driving shaft is connected in any suitable manner with an electric motor or the like indicated at 32. Hence, when the motor is in operation, the shaft 30 will be rotated and this rotary movement will be transmitted through the gears 26 and 31 to oscillate the rocker arm 14 through means of the pins 27 and 28 and the connecting rod 29.

If the gear racks assume a neutral position, no movement will be transmitted to the pinion, but if either rack is moved into mesh within the pinion, an oscillating movement will be transmitted to the pinion, the driving shaft and the impeller and the washing machine will be in operation. The peripheral speed or velocity of the impeller will be the least when engagement is made with the gear rack 16 and will be considerably increased when the pinion meshes with the gear rack 15.

Efficient handling of all fabrics or clothes from the coarsest to the most delicate is thereby taken care of, as the velocity of the water and the movement of the clothes may be changed by increasing or decreasing the velocity of the impeller as already described.

The mechanism employed is exceedingly simple and easy to operate. The housing enclosing the driving mechanism is tight and as such may be packed with grease or any other suitable lubricant, thereby eliminating constant attention and lubricating troubles. Leakage of water from the hub is prevented, removal of the impeller is permitted and ready control is maintained at all times, as the speed of the impeller is regulated by the controlling lever, which may be swung from one notch to another as the operator may desire.

While certain features of the present invention are more or less specifically described, it should be understood that various changes may be resorted to within the scope of the appended claims. Similarly that various materials and finishes of the several parts employed may be such as the manufacturer may decide or varying conditions or uses may demand.

Having thus described the invention, what is claimed and desired to be secured by Letters Patent is:—

1. In a washing machine, a driving shaft, an impeller on the shaft, a gear pinion on the shaft, a pair of rack bars, one on each side of the pinion, means whereby an endwise movement back and forth is transmitted to the rack bars, and means whereby either rack bar may be moved into or out of mesh with the pinion.

2. In a washing machine, a driving shaft, an impeller on the shaft, a gear pinion on the shaft, a pair of rack bars, one on each side of the pinion, means whereby an endwise movement back and forth is transmitted to the rack bars, and a single actuating member whereby either rack bar may be moved into mesh with the pinion or maintained out of engagement therewith.

3. In a washing machine, a driving shaft, an impeller on the shaft, a gear pinion secured to the shaft, a rocker arm, a pivotal support for one end of the arm, a pair of gear racks on the swinging end of the arm and disposed one on each side of the gear pinion, means whereby either rack bar may be moved into or out of mesh with the gear pinion, and means for transmitting an oscillating movement to the rocker arm and the gear racks.

4. In a washing machine, a driving shaft, an impeller on the shaft, a gear pinion secured to the shaft, a rocker arm, a pivotal support for one end of the arm, a pair of gear racks on the swinging end of the arm and disposed one on each side of the gear pinion, means whereby an endwise movement is imparted to the rocker arm and the gear racks carried thereby so as to move one or another of the rack bars into mesh with the gear pinion, and means for transmitting an oscillating movement to the rocker arm and the gear racks.

5. In a washing machine, a driving shaft, an impeller on the shaft, a gear pinion secured on the shaft, a rocker arm, an excentric member forming a pivotal support for one end of the arm, a pair of gear racks mounted on the swinging end of the arm and disposed one on each side of the gear pinion, means for rotating the excentric so as to impart an endwise movement to the rocker arm, and thereby bringing one or another of the gear racks into mesh with the gear pinion, and means for transmitting an oscillating movement to the rocker arm and the gear racks.

6. In a washing machine, a driving shaft, an impeller on the shaft, a gear pinion secured on the shaft, a rocker arm, an excentric member forming a pivotal support for one end of the arm, a pair of gear racks mounted on the swinging end of the arm and disposed one on each side of the gear pinion, means for rotating the excentric so as to impart an endwise movement to the rocker arm and thereby bring one or another of the gear racks into mesh with the gear pinion, means for securing the excentric against movement when one or another of the gear racks is moved into mesh, and means for transmitting an oscillating movement to the rocker arm and the gear racks.

7. In a washing machine, a driving shaft, an impeller on the shaft, a plurality of reciprocating driving members adapted to oscillate the shaft at different speeds and means for selecting and connecting any one of the driving members with the shaft and for maintaining the other driving member out of engagement with the shaft.

8. In a washing machine, a driving shaft, an impeller on the shaft, a plurality of reciprocating driving members adapted to oscillate the shaft at different speeds and means for selecting and connecting any one of the driving members with the shaft and for maintaining the other driving member out of engagement with the shaft, said means also adapted to maintain all the driving members out of engagement with the shaft.

9. In a washing machine a driving shaft, an impeller on the shaft, a gear pinion on the shaft, a plurality of rack bars, means whereby an endwise movement back and forth is transmitted to the rack bars, and means whereby one of the rack bars may be moved into or out of engagement with the pinion, said means also adapted to maintain all of the rack bars out of engagement with the pinion.

10. In a washing machine a driving shaft, an impeller on the shaft, a gear pinion secured on the shaft, a rocker arm, an eccentric member forming a pivotal support for one end of the arm, a pair of gear racks mounted on the swinging end of the arm, and disposed one on each side of the gear pinion, means for rotating the eccentric so as to impart an endwise movement to the rocker arm and thereby bring one or the other of the gear racks into mesh with the gear pinion, means for securing the eccentric against movement when one or another of the gear racks is moved into mesh with the pinion, or when both racks are out of mesh and means for transmitting an oscillating movement to the rocker arm and the gear racks.

11. In a washing machine the combination with a tub, of a vertical shaft movably mounted therein and an agitating member; a rotatable constant-speed driving mechanism underneath the tub; a plurality of selectively usable driving gear connections of dissimilar mechanical advantage between the driving mechanism and the vertical shaft adapted and arranged to impart oscillatory movement to the latter; means for actuating one of said driving gear connections while maintaining the other driving gear connection inactive, and a manually operable controlling device for selectively completing said connections.

12. In a washing machine the combination with a tub, of a vertical shaft traversing the bottom thereof, an agitating member secured to said shaft inside the tub, a plurality of reciprocating driving gears movable simultaneously at different speeds and equal frequencies adapted to oscillate said shaft selectively, means for operating said driving-members at a uniform frequency, and means for connecting any one of the driving-members to said shaft selectively in operating relation.

13. In a washing machine the combination with a tub, and a reciprocating agitating member therein of a driving element operated at substantially constant speed and means for operatively connecting said driving element to said agitating member, said means including selectively usable toothed elements of dissimilar radius for imparting to said agitating member dissimilar amplitudes of reciprocation with a substantially fixed frequency.

14. In a washing machine, the combination with a tub, of an oscillatable agitating element mounted therein with its axis substantially vertical, a driving element of substantially fixed speed type, a double segmental rack element pivoted at one side of said axis, means connecting said driving element to said rack element in operating relation adapted to impart to said rack element a motion of uniform oscillation, said rack element having plural sets of driving teeth located at unequal distances from its pivot, cooperating toothed means coaxial with said shaft, and means for connecting said rack element to said shaft by way of either of said sets of driving teeth, selectively, so as to impart to said agitating element any one of a plurality of dissimilar amplitudes of oscillation.

15. In a washing machine, an oscillatable agitating element, a driving element operating at uniform speed, and movement transmitting means comprising mechanism for connecting said driving element to and disconnecting it from said washing element, and including selectively operable gear members adapted and arranged to impart to said oscillating element any one of a plurality of amplitudes while retaining the frequency of such oscillations substantially the same, in combination with manually operable devices accessible during the washing operation to effect the connecting an selecting movements of said mechanism.

16. In a washing machine, an agitator, a driving mechanism therefor including a rotary reciprocating member having a plurality of sets of teeth arranged in arcs of unequal radii and means for connecting said member to said agitator through any one of said sets of teeth selectively for actuating the agitator at different speeds.

17. In a washing machine, a motor, an agitator, and driving means of different speeds for actuating the agitator, including a duplex gear sector operatively connected to said motor, and means for connecting either of said sector gears to operate said agitator.

18. In a washing machine, an agitator, a multiple speed drive mechanism including a duplex reciprocating gear sector, a motor for reciprocating said gear sector and means to connect said sector to said agitator through either of its sets of teeth for actuating the agitator in accordance with either of said speeds.

19. In a washing machine, an agitator, a one-way rotatable shaft, a multiple speed drive mechanism including a crank arm carried by said shaft, a multiple gear sector operatively connected to said arm and having driving provisions of different pitch radii for translating the movement of said shaft into reciprocating movements, cooperating gear-means adapted to be actuated by said sector and to transmit its motion to said agitator, and means for operatively and selectively connecting said sector to said agitator through either one of its driving provisions.

20. In a washing machine, the combination with a tub of an oscillatable agitating element mounted therein with its axis substantially vertical, a driving element of substantially fixed speed type, means including separate trains of gearing of unequal mechanical advantage for connecting said driving element to said agitating element in operating relation adapted to impart to said agitating element dissimilar amplitudes of oscillation, and means for utilizing said trains of gearing selectively.

THE JOHNSON WASHER COMPANY,
*Assignee of Frank B. Schuyler, Deceased.*
By CLARENCE G. FRANTZ,
*President.*